(12) United States Patent
Kramer et al.

(10) Patent No.: US 8,574,485 B2
(45) Date of Patent: Nov. 5, 2013

(54) SYSTEMS AND METHODS FOR USING MULTI-PART CURABLE MATERIALS

(75) Inventors: Laura Kramer, Corvallis, OR (US); Terry M. Lambright, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1503 days.

(21) Appl. No.: 11/345,479

(22) Filed: Feb. 1, 2006

(65) Prior Publication Data

US 2006/0186579 A1 Aug. 24, 2006

Related U.S. Application Data

(62) Division of application No. 10/623,270, filed on Jul. 18, 2003, now abandoned.

(51) Int. Cl.
*B29C 35/04* (2006.01)

(52) U.S. Cl.
USPC .......................................................... 264/401

(58) Field of Classification Search
USPC .......................................................... 264/401
See application file for complete search history.

(56) References Cited

U.S. PATENT DOCUMENTS

| | | | |
|---|---|---|---|
| 5,059,266 A | | 10/1991 | Yamane et al. |
| 5,136,515 A | * | 8/1992 | Helinski ...................... 700/119 |
| 5,149,548 A | | 9/1992 | Yamane et al. |
| 6,372,173 B1 | * | 4/2002 | Peschges ...................... 264/401 |
| 6,401,002 B1 | * | 6/2002 | Jang et al. ...................... 700/119 |
| 6,569,373 B2 | * | 5/2003 | Napadensky .................. 264/401 |
| 6,658,314 B1 | * | 12/2003 | Gothait ......................... 700/119 |
| 6,841,116 B2 | * | 1/2005 | Schmidt ........................ 264/401 |
| 2002/0008333 A1 | * | 1/2002 | Napadensky et al. ......... 264/401 |
| 2002/0111707 A1 | * | 8/2002 | Li et al. ......................... 700/118 |
| 2002/0167101 A1 | | 11/2002 | Tochimoto |
| 2002/0195746 A1 | * | 12/2002 | Hull et al. ..................... 264/401 |
| 2003/0083396 A1 | * | 5/2003 | Ylitalo et al. ................... 522/74 |
| 2003/0209837 A1 | * | 11/2003 | Farnworth .................... 264/401 |
| 2004/0145088 A1 | * | 7/2004 | Patel et al. .................... 264/463 |

FOREIGN PATENT DOCUMENTS

DE 199 37 770 A1 2/2001

OTHER PUBLICATIONS

European Search Report for Application No. EP 04254179. Report issued Nov. 6, 2006.

\* cited by examiner

*Primary Examiner* — Amjad Abraham

(57) ABSTRACT

Solid freeform fabrication (SFF) systems for producing a three-dimensional object and methods of producing three-dimensional objects are disclosed. The SFF system includes a dispensing system and a curing system. The dispensing system is adapted to dispense a radiation initiator and a build material. The radiation initiator and the build material are stored separately in the dispensing system and are dispensed separately. The curing system cures the radiation initiator and the build material after each has been dispensed.

1 Claim, 3 Drawing Sheets

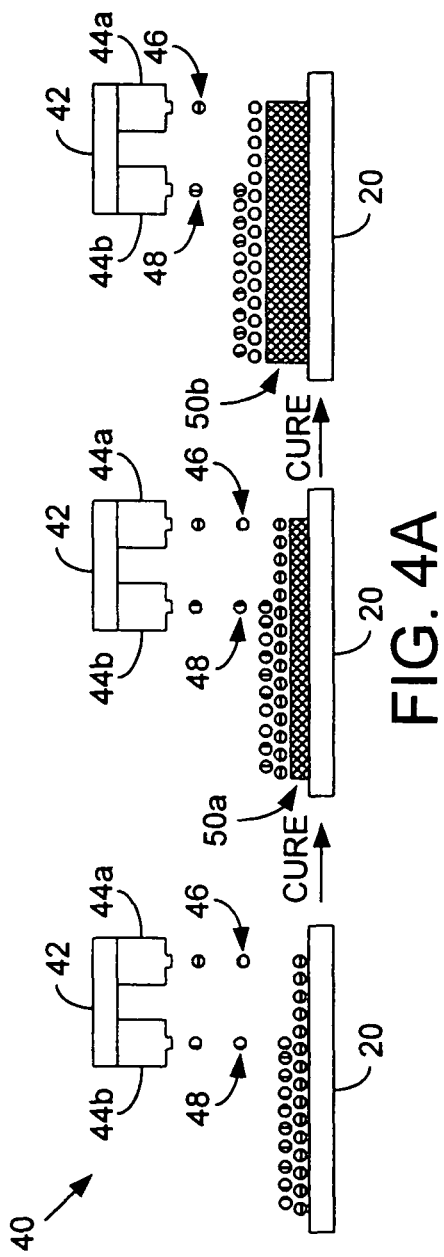
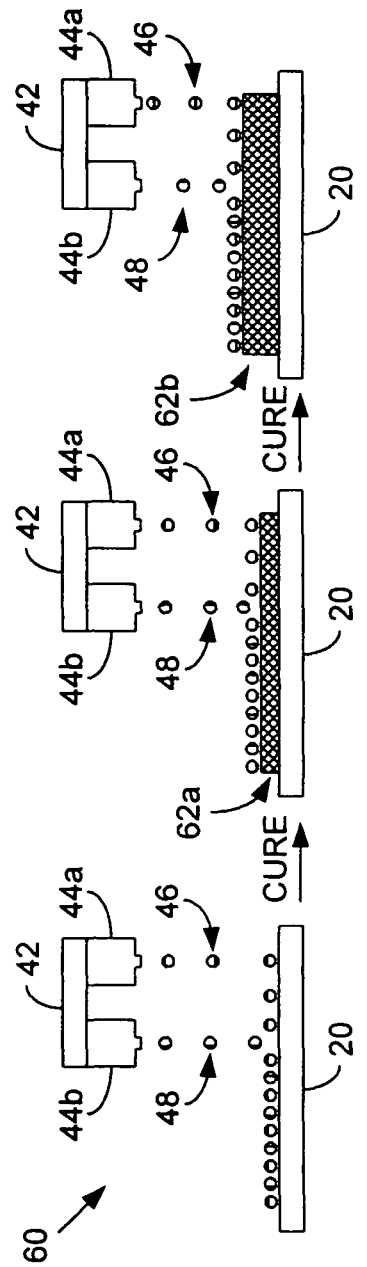
FIG. 4A
FIG. 4B

SYSTEMS AND METHODS FOR USING MULTI-PART CURABLE MATERIALS

CROSS-REFERENCE TO RELATED APPLICATIONS

This application is a Divisional of U.S. patent application entitled "Systems and Methods of Using Multi-Part Curable Materials", filed on Jul. 18, 2003 and assigned Ser. No. 10/623,270 now abandoned.

BACKGROUND

Solid freeform fabrication (SFF) or layer manufacturing (LM) is a fabrication technology that builds an object of any complex shape layer by layer or point by point without using a pre-shaped tool (die or mold). This process begins with creating a Computer Aided Design (CAD) file to represent the geometry of a desired object. SFF technology enables direct translation of the CAD image data into a three-dimensional object. SFF technology can be used in applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

One SFF technique involves adding or depositing a build composition to form predetermined areas of a layer essentially point-by-point; but a multiplicity of points may be deposited at the same time in some techniques (e.g., ink-jet technology). These predetermined areas together constitute a thin section of a three-dimensional object as defined by a CAD geometry. Successive layers are then deposited in a predetermined sequence with a layer being affixed to its adjacent layers forming an integral three dimensional, multi-layer object.

Typically, an SFF system includes a dispensing system such as an ink-jet dispensing system, a curing system, and a build platform. The build composition is stored within a compartment of the ink-jet dispensing system as a mixture of an initiator and a build material. The build composition is dispensed (i.e., jetted) onto the build platform from an ink-jet printhead of the ink-jet dispensing system.

Currently, the build compositions used in the SFF processes are limited to low viscosity materials (i.e., typically lower than 20 centipoise (cps) for good jetting) so that the build composition can be accurately dispensed. Viscosity is an important parameter for dispensing materials because materials having a high viscosity are difficult to dispense. One way to overcome problems associated with viscosity is to increase the dispensing temperature of the material. However, some of these build compositions degrade at the higher temperatures. In addition, heating the build compositions may initiate polymerization of the build composition prior to being dispensed. Therefore, build compositions with high viscosities that are unstable at higher jetting temperatures cannot be used.

SUMMARY

Briefly described, embodiments of this disclosure include solid freeform fabrication (SFF) systems for producing three-dimensional objects. One exemplary SFF system, among others, includes a dispensing system and a curing system. The dispensing system is adapted to dispense a radiation initiator and a build material. The radiation initiator and the build material are stored separately in the dispensing system and are dispensed separately. The curing system cures the commingled radiation initiator and the build material after each has been dispensed.

Methods of producing three-dimensional objects are also provided. One exemplary method includes, among others: providing a radiation initiator; providing a build material, wherein the radiation initiator and the build material are separated; dispensing the radiation initiator and the build material onto a build platform independently, wherein the radiation initiator and the build material are commingled to form a multi-part radiation curable material; and curing the multi-part radiation curable material to form the three-dimensional object.

BRIEF DESCRIPTION OF THE DRAWINGS

Many aspects of the invention can be better understood with reference to the following drawings. The components in the drawings are not necessarily to scale. Moreover, in the drawings, like reference numerals designate corresponding parts throughout the several views.

FIG. 3 is a representative flow diagram for forming an object using the embodiment of the SFF system shown in FIGS. 1 and 2.

FIG. 4A illustrates a layered dispensing process for use in the SFF system shown in FIGS. 1 and 2, while FIG. 4B illustrates an alternating dispensing process for use in the embodiment of the SFF system shown in FIGS. 1 and 2.

DETAILED DESCRIPTION

Multi-part radiation curable materials, methods of application thereof, and systems for using the multi-part radiation curable materials are provided. In particular, the embodiments relate to the use of multi-part radiation curable materials in the manufacture of three-dimensional objects by solid freeform fabrication (SFF) systems and methods. The term three-dimensional object refers to objects that are sufficiently rigid to maintain a fixed volume and shape to an extent, which is appropriate for use in SFF systems.

The multi-part radiation curable material includes, but is not limited to, one or more build materials and one or more radiation initiators. One embodiment of the multi-part radiation curable material is a two-part radiation curable material that includes, but is not limited to, a build material and a radiation initiator.

The multi-part radiation curable materials are stored separately within the SFF system and are dispensed in an independent manner onto a build platform. An advantage of the SFF systems includes the ability to dispense the build material at higher temperatures than previously possible. This allows higher molecular weight components to be used since their relatively high viscosity can be overcome by heating the components to a higher temperature. In this regard, the use of higher molecular weight build materials should result in better mechanical properties than previously obtained. In addition, since the components are stored separately, the shelf-life of the build material should be longer.

Figure 1:
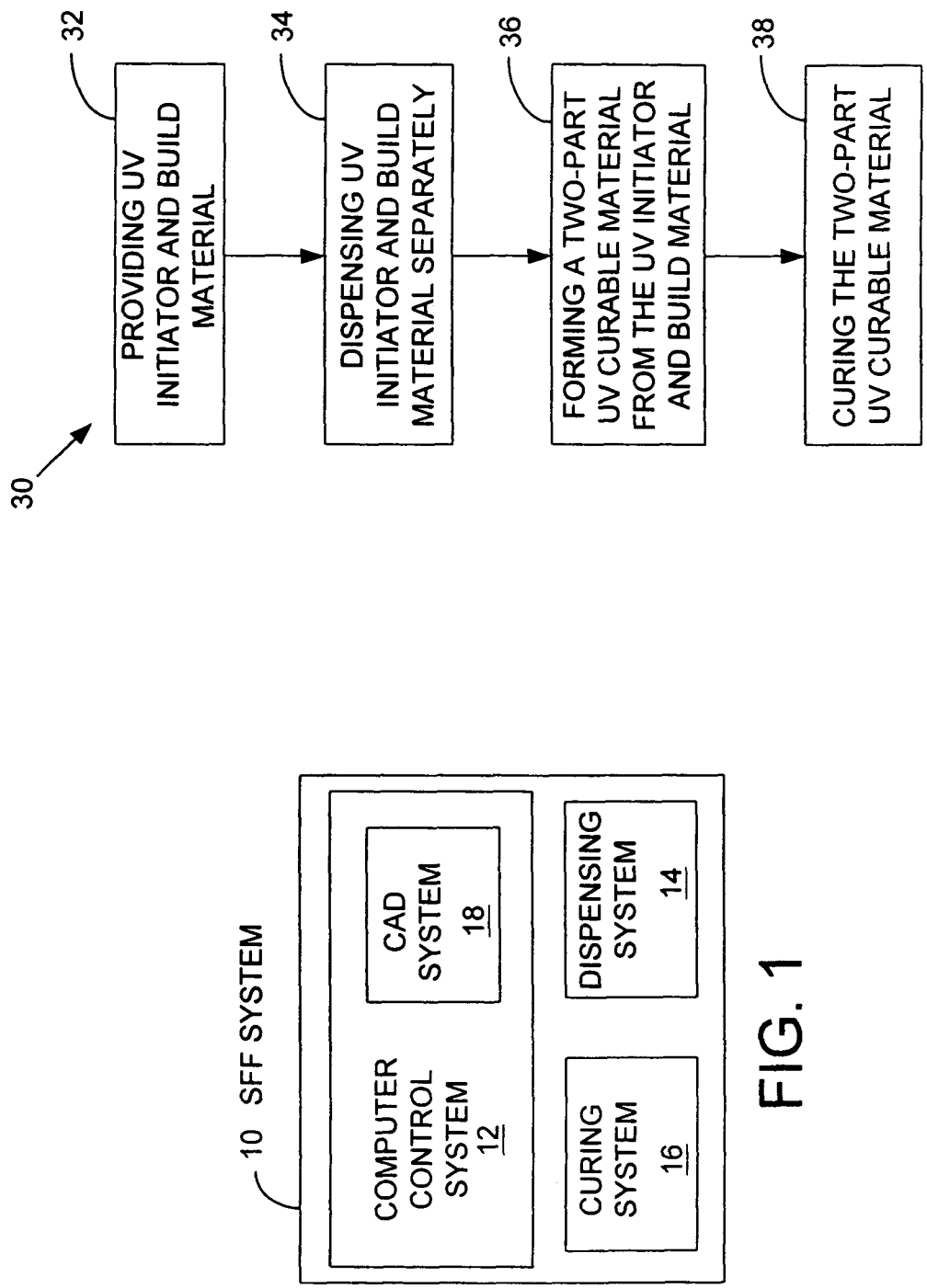
FIG. 1 illustrates an embodiment of a solid freeform fabrication (SFF) system.
Figure 2:
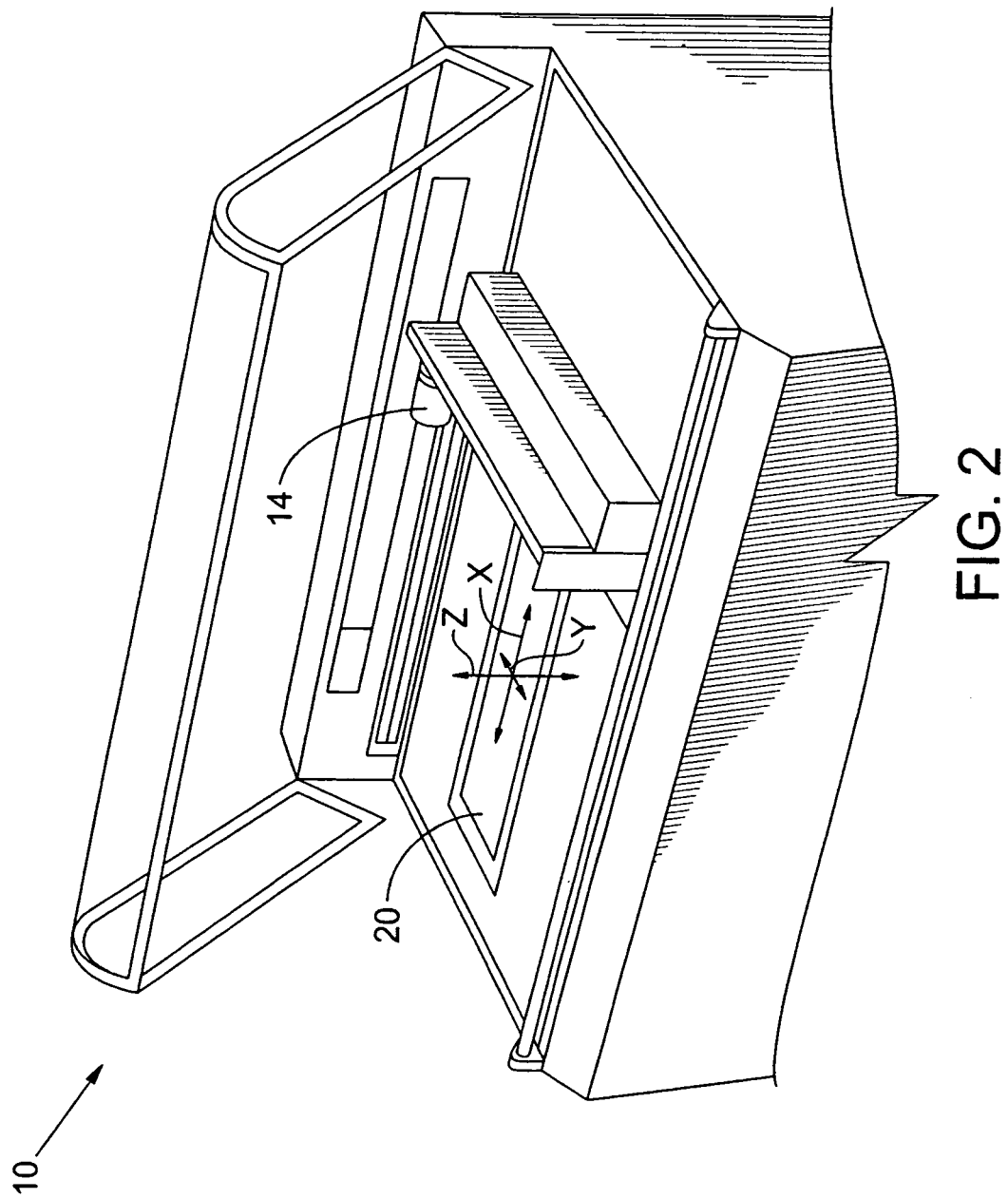
FIG. 2 illustrates a perspective view of an embodiment of a SFF apparatus.

FIG. 1 illustrates a block diagram of a representative SFF system 10 that includes a computer control system 12, a dispensing system 14, and a conventional curing system 16. FIG. 2 illustrates a perspective view of the SFF system 10 shown in FIG. 1. The computer control system 12 includes a process control system that is adapted to control the dispensing system 14, the curing system 16 (e.g., a ultraviolet or visible radiation curing system), and optionally a positioning system and a build platform temperature control system. In addition, the computer control system 12 includes, but is not limited to, a Computer Aided Design (CAD) system 18 or other SSF CAD-related systems.

The dispensing system 14 includes, but is not limited to, conventional ink-jet technologies and conventional coating technologies. Ink-jet technology, such as drop-on-demand and continuous flow ink-jet technologies, can be used to dispense chemical compositions onto a build platform 20 (FIG. 2). The dispensing system 14 can include at least one conventional ink-jet printhead (e.g., thermal ink-jet printhead and/or a piezo ink-jet print head) adapted to dispense (e.g., jet) one or more chemical compositions through one or more of a plurality of ink-jet printhead dispensers. In addition, the ink-jet printhead can include a plurality of ink-jet compartments (e.g., tanks or wells for containing the components) that are capable of holding the multi-part radiation curable materials and are fluidically coupled to the ink-jet printhead dispensers. The ink-jet printhead dispenser can be heated to assist in dispensing viscous chemical compositions. For example, the ink-jet printhead dispenser can be heated up to about 200° C., and preferably in the range of 70 to 120° C.

In one embodiment, the dispensing system 14 includes a separate ink-jet printhead for each component of the multi-part radiation curable material. For example, a two-part radiation curable material may include two ink-jet printheads, where one holds a radiation initiator and one holds a build material. In another example, a three-part radiation curable material may include three ink-jet printheads, where one holds a radiation initiator, a second holds a first build material, and the second includes a second build material. Disposing the components of the multi-part radiation curable material into different ink-jet printheads allows the components to be heated to different temperatures, which is advantageous when the viscosity of the build material is increased to enhance the dispensement of the build material.

The SFF system 10 can be incorporated into processes that are used to fabricate or construct three-dimensional objects in an iterative layered process. The computer control system 12 is capable of being selectively adjusted to control the output from the dispenser system 14, which controls the thickness and pattern of each component in each layer of the iterative process.

The radiation initiator and the build material can be dispensed onto the build platform in a variety of patterns, two of which are discussed in more detail in reference to FIGS. 4A and 4B below. The patterns can take the form of, but not limited to, alternating layers of the radiation initiators and build materials, alternating offset-checkerboard layers of the radiation initiators and build materials, and alternating side-by-side strips of the radiation initiators and build materials. In addition, other patterns are possible using two or more printheads. Moreover, the patterns of the components of the multi-part radiation curable material can vary depending on the volume or drop-size of the dispensed components. In this regard, multiple ink-jet printhead passes (e.g., scans) across the build platform 20 can be conducted to achieve the appropriate spacing of the components of the multi-part radiation curable material.

In general, the volume (e.g., drops) of the radiation initiator and the build material are from about 0.1 picoliters to 500 picoliters, about 0.1 picoliters to 100 picoliters, and about 0.1 picoliters to 35 picoliters. However, the desirable ejected volume of the radiation initiator and the build material depends on a number of factors such as, but not limited to, the concentration, the viscosity, and the chemical characteristics of the radiation initiators; the concentration, the viscosity, and the chemical characteristics of the build materials, the temperature of the build platform, the ratio between the radiation initiators and the build materials, the desired resolution (e.g., 600 drops per inch), and the design of the print-head firing chamber.

The multi-part radiation curable material includes chemicals that are compatible for use with ink-jet technologies. The multi-part radiation curable material can be a multi-part ultraviolet (UV) radiation curable material or a multi-part visible radiation curable material. The preferred embodiment is a two-part UV curable material that includes, but is not limited to, a UV initiator and build material. FIG. 3 and FIGS. 4A and 4B refer to a two-part UV curable material, however, the same principals can be adopted for multi-part radiation curable materials.

FIG. 3 is a flow diagram describing a representative method 30 for forming an object using the SFF system 10. The UV initiator and the build material are provided, as shown in block 32. In particular, the UV initiator and the build material are stored separately in the dispensing system 14. For example, the UV initiator and the build material can be stored in different compartments of a single ink-jet printhead or stored in different ink-jet printheads. The UV initiator and the build material are dispensed through different ink-jet printhead dispensers either simultaneously or in a step-wise manner, as shown in block 34. The UV initiator and the build material are commingled on the build platform 20 of the SFF system 10 to form the two-part UV curable material, as shown in block 36. In addition, ultrasonic energy can be used to mix the UV initiator and the build material to enhance commingling of the UV initiator and the build material.

After one or more layers of the UV initiator and the build material are dispensed (e.g., simultaneously or sequentially) onto the build platform 20, the curing system 16 can be used to cure, or partially cure, the two-part UV curable material, as shown in block 38. Then the process is repeated as necessary to produce the object of interest in a layer-by-layer fashion. To enhance layer-to-layer adhesion, it may be useful to only partially cure each layer during the fabrication process. A full cure could be accomplished by placing the object in a light box after removal from the fabrication tool. In addition, the curing process can be performed after the layers of the multi-part radiation curable material are disposed on the build platform 20 (e.g., flood exposure or scan exposure). Furthermore, the curing process can be performed in a substantially contemporaneous manner by scan exposing the multi-part radiation curable material as the radiation initiator and build material are dispensed onto the build platform 20.

FIG. 4A illustrates a layered dispensing process of the build material 46 and the UV initiator 48 onto the build platform 20. The build material 46 and the UV initiator 48 are dispensed from an ink-jet printhead 42 having two compartments 44a and 44b. First, a layer of the build material 46 is dispensed onto the build platform 20, then a layer of UV initiator 48 is dispensed onto the layer of the build material 46. The build material 46 and the UV initiator 48 are cured to form layer 50a. Subsequently, another layer of the build material 46 is dispensed onto the cured layer 50a, then another layer of the UV initiator 48 is dispensed onto the layer of the build material 46. The build material 46 and the UV initiator 48 are cured to form layer 50b. This process continues until the object to be formed is complete. It should be noted that the order in which the build material 26 and the UV initiator are dispensed could be reordered (e.g., reversed).

FIG. 4B illustrates an alternating dispensing process dispensing the build material 46 and the UV initiator 48 onto the build platform 20. The build material 46 and the UV initiator 48 are dispensed from an ink-jet printhead 42 having two compartments 44*a* and 44*b*. The build material 46 is dispensed onto the build platform 20 in a spaced manner so that the UV initiator 48 can be dispensed within the spaces between the build material 46. Next, the build material 46 and the UV initiator 48 are cured to form layer 62*a*. Subsequently, the build material 46 is dispensed onto the cured layer 62*a* in a spaced manner so that the UV initiator 48 can be dispensed within the spaces between the build material 46. The build material 46 and the UV initiator 48 are cured to form layer 62*b*. This process continues until the object to be formed is complete.

In general, the radiation initiator and/or the build material can be carried and/or dissolved into a liquid vehicle that is compatible with ink-jet technologies. For example the liquid vehicle can include, but is not limited to, water, solvents, biocides, and sequestering agents.

In one embodiment, the radiation initiator can be dissolved in one or more solvents, such as, but not limited to, inert volatile solvents such as aliphatic and aromatic hydrocarbons of lower molecular weight, volatile alcohols, ethers, and esters, and high boiling point plasticizers (e.g., dibutyl phthalate). It's desirable that the solvent either evaporate quickly (within time necessary to deposit few layers) or is non-volatile enough to stay indefinitely long within the cured two-part radiation material.

In the embodiment described directly above, the volume of the radiation initiator relative to the volume of the build material dispensed onto the build platform 20 should be about 1 part radiation initiator to 100 parts of the build material, although in some embodiments it may be 1 part of the radiation initiator to 10 parts of the build material, while in still others it may be 1 part of the radiation initiator to 1 part of the build material. The ratio of the volumes of the components can be controlled by the drop volume and/or the number of drops of the components.

In other embodiments, the radiation initiator can be dissolved in a solvent such as, but not limited to, low reactivity monomers/low viscosity monomers, such as low molecular weight monofunctional alkyl acrylates and alkyl methacrylates (e.g., allyl methacrylate, isodecyl acrylate and methacrylate, isooctyl acrylate), hydroxyalkyl acrylates and methacrylates (e.g., 2-hydroxyethyl methacrylate), glycidyl methacrylate, isobornyl acrylate, and the like. In particular, monofunctional monomer solvents are preferred to dissolve the radiation initiator, because monofunctional monomers provide better stability than di- and tri-functional monomers and are less likely to cross-link. In addition, low viscosity monomers are preferred as solvents for radiation initiators so that the mixture can be dispensed at a lower temperature. In these embodiments, the solvent participates in the polymerization reaction and becomes part of the multi-part radiation curable material.

In the embodiment described directly above, the volume of the radiation initiator relative to the volume of the build material dispensed onto the build support 20 should be about 10 to 100 parts of the radiation initiator to about 100 parts of the build material, while in others it may be about 50 parts of the radiation initiator to 100 parts of the build material. The ratio of the volumes of the components can be controlled by the drop volume and/or the number of drops of the components.

In general, the radiation initiator and the build material have the characteristic that the chemical has a viscosity (i.e., a jettable viscosity) less than 70 cps at a temperature below about 200° C. and preferably less than 20 cps at a temperature below about 100° C.

In addition, the radiation initiator and the build material should be able to react to form a "tack free" layer within about 5 seconds to 10 minutes at a temperature below about 100° C. Preferably, the radiation initiator and the build material should be able to react to form a "tack free" layer within about 5 seconds to 1 minute at a temperature below about 60° C. The term "tack free" is defined as the point where the crosslinking/chain growth reaction has progressed such that the resulting material is no longer tacky to the touch. It does not imply that curing/chain growth is complete.

As is known in the art, the viscosity of the build material can generally be lowered by increasing its temperature. Therefore, the ink-jet printhead can be heated to lower the viscosity of the build material. The use of higher temperatures can allow more viscous higher molecular weight materials to be used in the build material, which can provide for more desirable mechanical properties of the solid three-dimensional object upon cooling. However, the ink-jet printhead should not be heated to temperatures that exceed: (a) the boiling point of the build material; (b) the temperature of thermal decomposition of the build material used; and (c) the temperature of the build material thermal activation.

In general, the radiation initiator and/or the build material can include additional chemical components such as, but not limited to, colorants (e.g., dyes, pigments, inks), dispersants, and catalysts to optimize the reaction time of the multi-part radiation curable material to obtain the proper balance of cure rate and layer-to-layer adhesion.

The UV initiator can include chemicals such as, but not limited to, a free radical initiator, a cationic initiator, or combinations thereof. The free-radical initiator includes compounds that produce a free radical on exposure to UV radiation. The free-radical is capable of initiating a polymerization reaction. Exemplar free-radical initiators include, but are not limited to, benzophenones (e.g., benzophenone, methyl benzophenone, Michler's ketone, and xanthones), acylphosphine oxide type free radical initiators (e.g., 2,4,6-trimethylbenzoyldiphenyl phosphine oxide (TMPO), 2,4,6-trimethylbenzoylethoxyphenyl phosphine oxide (TEPO), and bisacylphosphine oxides (BAPO's)), azo compounds (e.g., AIBN), benzoins and bezoin alkyl ethers (e.g., benzoin, benzoin methyl ether and benzoin isopropyl ether).

The free-radical initiator can be used alone or in combination with a co-initiator. Co-initiators are used with initiators that need a second molecule to produce a radical that is active in UV-systems. For example, benzophenone uses a second molecule, such as an amine, to produce a reactive radical. A preferred class of co-initiators are alkanolamines such as, but not limited to, triethylamine, methyldiethanolamine and triethanolamine Suitable cationic initiators include, but are not limited to, compounds that form aprotic acids or Bronsted acids upon exposure to UV light sufficient to initiate polymerization. The cationic initiator used may be a single compound, a mixture of two or more active compounds, or a combination of two or more different compounds (e.g., co-initiators). Exemplary cationic initiators include, but are not limited to, aryldiazonium salts, diaryliodonium salts, triarylsulphonium salts, and triarylselenium salts.

The build material can include compounds such as, but not limited to, acrylic compounds, compounds having one or more epoxy substituents, one or more vinyl ether substituents, vinylcaprolactam, vinylpyrolidone, norbornenes, urethanes, and combinations thereof. In particular, monomers of these compounds can be used as the build material. In addition, oligomers of these compounds, which may not have been considered previously because of their high viscosity, can be used as the build material. In this regard, the increased viscosity latitude allows us to start with higher molecular weight build materials, which may result in better mechanical properties (e.g., material stiffness/flexibility and strength, and resistance to impact) in the final three-dimensional object. One skilled in the art could select build materials that satisfy the desired mechanical properties of a particular application.

Suitable acrylic compounds for the build material can include, but are not limited to, an acrylic monomer, an acrylic oligomer, an acrylic crosslinker, or combinations thereof. An acrylic monomer is a monofunctional acrylated molecule, which can be, for example, esters of acrylic acid and methacrylic acid. An acrylic oligomer (an oligomer is a short polymer chain) is an acrylated molecule, which can include, but is not limited to, polyesters of acrylic acid and methacrylic acid and a polyhydric alcohol (e.g., polyacrylates and polymethacylates of trimethylolpropane, pentaerythritol, ethylene glycol, propylene glycol). In addition, the acrylic oligomer can be a urethane-acrylate.

An acrylic crosslinker is a polyfunctional molecule, which provides enhanced crosslinking. Examples of acrylic crosslinkers includes, but is not limited to, 1,4-butanediol diacrylate, 1,4-butanediol dimethacrylate, 1,6-hexamethylene glycol diacrylate, neopentyl glycol dimethacrylate, trimethylol propane trimethacrylate, pentaerythritol triacrylate, penta-erythritol trimethacrylate triethylene glycol triacrylate, triethylene glycol trimethacrylate, urethane acrylate, trimethylol propane triacrylate, and urethane methacrylates.

The build material can also be a chemical having one or more vinyl ether substituents such as, but not limited to, vinyl ether monomers and oligomers having at least one vinyl ether group. Exemplary vinyl ethers include, but are not limited to, ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether, and 1,4 cyclohexane dimethanol divinyl.

The build material can also include chemicals having one or more epoxy substituents such as, but not limited to, epoxy monomers and oligomers having at least one oxirane moiety. Examples of epoxy-containing build materials include, but are not limited to, bis-(3,4-cyclohexylmethyl carboxylate), 3,4-epoxy cyclohexylmethyl carboxylate, 3,4-epoxycyclohexyl carboxylate, diglycidyl ether vinylcyclohexene, 1,2-epoxy-4-vinylcyclohexane carboxylate, 2,4-epoxycyclohexylmethyl carboxylate, 3,4-epoxy cyclohexane carboxylate, and the like.

Preferably, the build material includes chemicals such as, but not limited to, acrylates and derivatives thereof, epoxy acrylates and derivatives thereof, urethane acrylates and derivatives thereof, norbornenes and derivatives thereof, and combinations thereof. In addition, the build material can include materials, which otherwise may be excluded from solid freeform fabrication processes using ink-jet technologies because of high viscosity at room temperature. These build materials can include, but are not limited to, ethoxylated acrylates, methacrylates (e.g., ethoxylated nonyl phenol acrylate, which has a viscosity of about 100 cps at 25° C. (Sartomer Inc., SR504), ethoxylated nonyl phenol ethacrylate, which has a viscosity of about 80 cps at 25° C. (Sartomer Inc., CD612), ethoxylated bisphenol dimethacrylate, which has a viscosity of about 400 cps at 25° C. (Sartomer Inc., SR480)), caprolactone acrylate, which has a viscosity of about 80 cps at 25° C. (Sartomer Inc., SR495), and the like.

In addition, the build material can include high viscosity materials such as, but not limited to, monomers and oligomers such as: ethoxylated bisphenol-A dimethacrylate compounds (e.g., Sartomer Inc., SR348 (1082 cps at 25° C.), Sartomer Inc., SR9036 (610 cps at 25° C.), Sartomer Inc., CD541 (440 cps at 25° C.), Sartomer Inc., SR480 (410 cps at 25° C.), and Sartomer Inc., CD540 (555 cps at 25° C.)), ethoxylated bisphenol-A diacrylates compounds (e.g., Sartomer Inc., SR601 (1080 cps at 25° C.), Sartomer Inc., SR602 (610 cps at 25° C.), CD9038 (680 cps at 25° C.), and Sartomer Inc., SR349 (1600 cps at 25° C.)), pentaerythrol triacrylate compounds (e.g., Sartomer Inc., SR344 (520 cps at 25° C.)), and ethoxylated trimethylolpropane triacrylate compounds (e.g., Sartomer Inc., SR415 (225-520 cps at 25° C.)).

It should be noted that viscosity, temperature, ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

The visible radiation initiator can include, but is not limited to, ☐-diketones (e.g., camphorquinone, 1,2-acenaphthylenedione, 1H-indole-2,3-dione, 5H-dibenzo[a,d]cycloheptene-10, and 11-dione), phenoxazine dyes (e.g., Resazurin, Resorufin), acylphosphine oxides, (e.g., diphenyl(2,4,6-trimethylbenzoyl)phosphine oxide), and the like.

Many variations and modifications may be made to the above-described embodiments. All such modifications and variations are intended to be included herein within the scope of this disclosure and protected by the following claims.

At least the following is claimed:

1. A method of producing a three-dimensional object, comprising the steps of:
providing a radiation initiator in a first compartment devoid of a build material;
providing a build material in a second compartment devoid of a radiation initiator, the build material being selected from an acrylic compound, a compound having one or more epoxy substituents, a compound having one or more vinyl ether substituents, a vinylcaprolactam, a vinylpyrrolidone, a norbornene, a urethane, and a combination thereof;
dispensing the radiation initiator from the first compartment and separately dispensing the build material from the second compartment in a manner in which the radiation initiator and the build material commingle for the first time outside of their respective compartments to form a multi-part radiation curable material; and
curing the multi-part radiation curable material to produce the three-dimensional object;
wherein dispensing the radiation initiator and the build material includes:
depositing the build material on a surface in a spaced manner; and depositing the radiation initiator on the surface within the spaces between the build material, wherein the build material and the radiation initiator form a layer of commingled build material and radiation initiator thereby forming the multi-part radiation curable material.

* * * * *